United States Patent
Reese et al.

(10) Patent No.: US 8,334,010 B2
(45) Date of Patent: Dec. 18, 2012

(54) METHOD FOR PRODUCING A COMPOSITE MATERIAL FROM STONES AND A PLASTIC MATERIAL

(75) Inventors: Hans-Juergen Reese, Damme (DE); Hans Ulrich Schmidt, Osnabrueck (DE); Johann Leitner, Olching (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 767 days.

(21) Appl. No.: 11/917,349

(22) PCT Filed: Jun. 14, 2006

(86) PCT No.: PCT/EP2006/063230
§ 371 (c)(1),
(2), (4) Date: Dec. 13, 2007

(87) PCT Pub. No.: WO2006/134136
PCT Pub. Date: Dec. 21, 2006

(65) Prior Publication Data
US 2010/0028542 A1  Feb. 4, 2010

(30) Foreign Application Priority Data
Jun. 14, 2005  (DE) .................. 10 2005 027 551

(51) Int. Cl.
*B05C 1/16* (2006.01)
*B05D 5/10* (2006.01)
*B05D 7/00* (2006.01)
*E01C 5/00* (2006.01)

(52) U.S. Cl. .................. 427/136; 427/212; 427/215

(58) Field of Classification Search .................. 427/136, 427/212, 215
See application file for complete search history.

(56) References Cited

U.S. PATENT DOCUMENTS

| 4,400,413 A | * | 8/1983 | Emmons et al. ............... 427/136 |
| 4,874,675 A | * | 10/1989 | Ceska ........................... 428/521 |
| 4,933,744 A | | 6/1990 | Segawa et al. |
| 5,626,761 A | | 5/1997 | Howery et al. |
| 6,051,634 A | * | 4/2000 | Laas et al. ...................... 524/4 |
| 6,084,011 A | * | 7/2000 | Lucero et al. .................. 524/5 |
| 6,228,500 B1 | | 5/2001 | Hiroshige et al. |

FOREIGN PATENT DOCUMENTS

| DE | 35 02 997 | | 7/1986 |
| DE | 102 41 293 | | 3/2004 |
| DE | 10241293 A1 | * | 3/2004 |
| EP | 0 037 442 | | 10/1981 |
| EP | 1 300 439 | | 4/2003 |
| FR | 2 722 223 | | 1/1996 |
| JP | 2001234546 A | * | 8/2001 |
| WO | 99 50369 | | 10/1999 |
| WO | 02 18617 | | 3/2002 |
| WO | 2004 078861 | | 9/2004 |

OTHER PUBLICATIONS

Machine English translation of DE 10241293 A1.*
Machine English translation of JP 2001234546 A.*
Machine English translation of DE 10241293 A1; Publication Date: Mar. 2004.*
Machine English translation of JP 2001234546 A; Publicaiton Date: Aug. 2001.*

* cited by examiner

*Primary Examiner* — Michael Cleveland
*Assistant Examiner* — Michael Wieczorek
(74) *Attorney, Agent, or Firm* — Oblon, Spivak, McClelland, Maier & Neustadt, L.L.P.

(57) ABSTRACT

The invention relates to a process for the production of a composite of a plastic and loose stones, comprising the steps
a) mixing of the loose stones with the liquid starting components of the plastic in a mixer,
b) discharge of this mixture from the mixer,
c) curing of the plastic.

20 Claims, No Drawings

METHOD FOR PRODUCING A COMPOSITE MATERIAL FROM STONES AND A PLASTIC MATERIAL

The invention relates to a process for the production of composite of stones, in particular crushed rock, and a plastic, in particular a compact polyurethane, which can be used in particular in the stabilization of banks or of structures, such as supporting and construction elements which are present at least partly in moving waters.

The stabilization of banks, in particular of bank slopes, is frequently necessary for regulation of flowing waters. In the case of new construction and in particular in the renovation of waterways and levees, at least regions of the bank must be stabilized.

To date, composite bodies comprising crushed rock and high-quality concrete have been prefabricated and placed at a location of use for such renovation purposes. In this method, however, renovation of damaged regions of the bank on site is not possible. Moreover, the components generally have a very high weight. A further disadvantage of concrete is the lack of elasticity. This means that the concrete does not withstand any stresses and these composites easily become detached.

One possibility for renovating damaged regions of the bank on site is the use of hardening tar formations or wet concretes or wet mortars which were distributed over the crushed rock of the bank slopes which is to be consolidated. By means of this method, consolidation of the bank slopes can be achieved for a certain time. There is however, above all, the ecological disadvantage that, in the course of time, phenolic or other environmentally harmful compounds may be released from the tar. Furthermore, substantially gap-free structures form in these procedures. Any cavities in the bank region which are present in the interior are filled.

The use of polyurethanes for the production of moldings with mineral ingredients and for stabilizing rock layers, in particular in mining, is also known.

Thus, DE 35 02 997 describes a method for consolidating geological formations in mining by polyurethane foams. Here, the formation to be consolidated is provided with drilled holes which are filled with the mixture of the liquid components for the polyurethane reaction and then closed. The polyurethane foams and is thus distributed in the opening of the rock formation. The formation is consolidated by the subsequent curing of the polyurethane foam. However, such a method cannot be used in the renovation of slopes, in particular bank slopes, since foaming is not desired there since the penetration of water into the foam in the course of time would result in destruction of the foam.

DE 102 41 293 describes a method for stabilizing banks. There, a strongly hydrophobic compact polyurethane is applied to that part of the bank which is to be stabilized. However, this requires a uniform surface of the corresponding bank section.

In another embodiment of this method, moldings are produced by introducing rock, preferably crushed rock, into a mold and applying the polyurethane system thereto, said polyurethane system being understood as meaning the liquid reaction mixture of the starting components of the polyurethane. The molding formed after the curing can be placed on the bank slope.

In both cases, however, uniform distribution of the polyurethane on the rock can scarcely be achieved. When the system is distributed over the bank slope, insufficient consolidation of the slope can moreover occur, particularly in the case of a nonuniform ground.

It was an object of the invention to provide a simple method for stabilizing banks, in which a high strength of the bank can be achieved and in which the stabilized bank also withstands a high mechanical load.

The object could be achieved by mixing the liquid starting components of a plastic with stones in a mixing apparatus in a first step and, in a second step, distributing this mixture over the bank section to be stabilized or onto the structures, such as supporting and construction elements, which are present at least partly in moving waters or introducing said mixture into a mold, where the plastic cures.

The invention accordingly relates to a process for the production of a composite of a plastic and loose stones, comprising the steps
  a) mixing of the loose stones with the liquid starting components of the plastic in a mixer,
  b) discharge of this mixture from the mixer,
  c) curing of the plastic.

The plastics may be, for example, polyurethane, epoxy resins, unsaturated polyester resins, acrylates and methacrylates. Polyurethane is preferably used.

The loose stones are preferably crushed rock, particularly preferably crushed granite. The stones have a size from 1 to 50 cm, preferably from 1 to 20 cm, particularly preferably from 2 to 15 cm, in particular from 2.5 to 6.5 cm.

In principle, all types of mixers with which substantially complete wetting of the stones with the liquid starting components of the plastic is possible can be used as a mixer for mixing the loose stones with the starting components of the plastic. Mixers which consist of an open container, preferably of a drum, which is preferably provided with the internals have proven particularly suitable. For the mixing, either the drum can be rotated or the internals can be moved.

Such mixers are known and are used, for example, in the building industry for the production of concrete mixes.

If the mixture is applied directly to the surface to be stabilized, it may be advantageous to attach the mixer to a vehicle, for example a tractor, a front loader or a truck. In this embodiment of the process according to the invention, the mixture can be transported in each case to the place where it is to be applied. After emptying of the mixer, the mixture can be distributed manually, for example by means of rakes.

In an embodiment of the process according to the invention, the mixing of the stones with the liquid starting components of the plastic is carried out continuously. For this purpose, the stones and the liquid starting components of the plastic are introduced continuously into the mixer and the wetted stones are continuously discharged. In this procedure, it is necessary to ensure that the starting materials remain in the mixer until sufficient wetting of the stones can take place. Expediently, such a mixing apparatus can be moved along the sections to be stabilized at a speed such that the stones wetted with the liquid starting components of the plastic are discharged from the mixer in an amount required for stabilization. It is also possible to operate the continuous mixing means in a stationary manner and to transport the wetted stones discharged from the mixer to the desired location.

In a further embodiment of the continuous development of the process according to the invention, the mixer may be a rotating drum into which stones are introduced continuously. This drum is equipped with nozzles which continuously distribute the starting components of the plastic over the stones. Here, the rotation of the drum ensures thorough mixing of plastic and stones. Plastic/stone composites are then discharged continuously through an opening at the end of the drum. The rotating drum may be horizontal but may also be inclined at various angles in order to promote the discharge.

In a further embodiment of the continuous process, the stones are transported continuously on a conveyor belt which is moved through a tunnel. Said tunnel has openings through which the starting materials of the plastic are discharged continuously onto the stones. At the end of the conveyor belt, the stones then fall into an open mixing drum, which discharges the composite at an adjustable transport speed.

The thickness of the layer comprising the composite is preferably at least 10 cm, since the mechanical stability is frequently insufficient in the case of smaller thicknesses. Maximum thickness is dependent on the local circumstances and may be, for example, up to 5 meters.

In the production of moldings, the mixture of the loose stones with the liquid starting components of the plastic is introduced, after the mixing, into a mold which is preferably open at the top, in which mold the plastic cures. The composite body thus formed can be applied to the bank. The moldings preferably have a size of from 100+50×100+50×15+10 cm.

The time for the mixing should be at least such that the stones are wetted as completely as possible with the liquid mixture and at most so long that the plastic has not yet cured.

It is also possible in principle to apply the loose stones in the desired thickness to the bank section to be stabilized and to apply the liquid starting components of the plastic thereon by means of a suitable apparatus, for example a spray gun, where they are distributed and cure. Compared with the process according to the invention, however, this procedure has the disadvantage that here the distribution of the plastic is nonuniform and defects where there is no plastic cannot be ruled out. Furthermore, when loosely adhering impurities, such as sand or earth, are present, there may be problems with the adhesion of the stones to one another and hence with the stability of the composite.

In comparison, it is possible in the process according to the invention also to use those stones which have loosely adhering impurities on their surface. These impurities are removed from the surface of the stones by the mechanical stress during the mixing process and therefore can no longer impair the adhesion of the stones to one another.

In a preferred embodiment of the process according to the invention, sand can be applied to the surface of the molding. To ensure that the sand adheres to the surface, the application of the sand should be effected before curing of the plastic is complete.

Any desired sands may be used. These may be natural sand or synthetic sand, such as slag sand or crushed slag sand.

In a preferred embodiment, quartz sand is used.

The particle size of the sand may vary within wide limits. The particle size is preferably in the customary range of 0.002-2 mm. Fine sand, i.e. sand having a particle size of 0.06-0.2 mm, medium sand having a particle size of 0.2-0.6 mm and/or coarse sand having a particle size of 0.6-2.0 mm, are preferably used.

The amount of the sand may be such that the surface of the moldings is substantially covered, but blockage of the pores of the molding does not occur. The sand is preferably applied in an amount of from 2 to 4 kg/m$^2$ of the molding.

The sand results in reinforcement of the contact points between the stones. Furthermore, the sand improves the UV protection of the molding.

The rough surface produced by the sand promotes the settlement of living organisms, such as plants and mosses, on the moldings distributed. This may be advantageous, for example, when distributing the moldings in nature conservation areas.

The ratio of plastic to stone is at least chosen so that sufficient strength of the composite is ensured. The exact amounts also depend, for example, on the level of stress of the molding on the respective bank sections.

Since, in the case of the composites according to the invention, the stones are connected to one another substantially at the contact surfaces, gaps form, and the composites are water-permeable. Consequently, the energy with which the water strikes the composite comprising crushed rock is better absorbed by the escape of the water into cavities and does not lead to destruction of the molding.

In the present invention, banks may be understood as meaning the banks of streams, rivers or canals. Furthermore, the banks may be shores of lakes, reservoirs or coastal sections of seas. They may be flat shores, slopes, dams, platforms or levees.

A further possibility for using the method according to the invention is for the protection of structures which are present at least partly in moving water from so-called subsurface erosion. This is understood as meaning local deepening of the ground of the flowing waters, in particular of stream bottoms, at least in the case of strong water currents in narrow sections, frequently also at bridge piers, where the foundations are attacked by rotating currents, the so-called water roll, due to the congestion and the subsequent stronger gradient. The same effect is to be found, for example, in the case of supporting pillars or bridge piers of sea bridges, water bridges and/or floating bridges, docks, such as floating, solid breakwaters, boat moorings or dry docks, in quays, boat houses, bank walls, drilling rigs, offshore installations, such as wind power installations, sea markers, lighthouses or measuring platforms, hydroelectric power stations, tunnels or piles.

The method according to the invention can be particularly advantageously used in this way since other methods of distributing the liquid components of the plastic would be disadvantageous in this application. If, for example, the stones were firstly introduced and the liquid components of the plastic were then to be applied to them, a uniform distribution of the components over the stones might not be obtained owing to the water movement.

The geometry of the composite installed to prevent subsurface erosion depends on the respective currents.

The composites for preventing subsurface erosion can be installed both directly on the structures and remote from them, depending on the currents.

Owing to the open gap system of the composite bodies, which can absorb the hydrodynamic energy so that the wave and flow energy collapses and consequently leads to less subsurface erosion, damage to structures can be avoided and the load-bearing capacity for supporting and construction elements can be increased.

A further advantage is that repairs to the composites can be carried out in a simple manner.

As described, the plastics are those which are prepared from liquid starting components which cure to give solid plastics. The plastics are preferably compact, i.e. they comprise virtually no pores. Compared with cellular plastics, compact plastics are distinguished by greater mechanical stability. Bubbles within the plastic may occur and are generally not critical. However, they should as far as possible be minimized.

In addition, it is preferable if the plastics are hydrophobic. As a result, degradation of the plastics by the water is suppressed.

Regarding the preferably used polyurethanes, the following may be stated.

In the context of the present invention, components of the polyurethane are understood as meaning very generally compounds having free isocyanate groups and compounds having groups which are reactive with isocyanate groups. Groups which are reactive with isocyanate groups are generally hydroxyl groups or amino groups. Hydroxyl groups are preferred since the amino groups are very reactive and the reaction mixture therefore has to be rapidly processed. Products formed by reaction of these components are referred to below generally as polyurethanes.

In neither of the two process variants is it necessary for the stones to be present in dry form. Surprisingly, good adhesion between the polyurethane and the stones can also be obtained in the presence of wet stones and even under water.

The polyurethanes used may be conventional and known compounds of this type. These materials are prepared by reacting polyisocyanates with compounds having at least two active hydrogen atoms. In principle, all polyisocyanates, mixtures and prepolymers having at least two isocyanate groups which are liquid at room temperature can be used as polyisocyanates.

Aromatic polyisocyanates are preferably used, particularly preferably isomers of toluene diisocyanate (TDI) and of diphenylmethane diisocyanate (MDI), in particular mixtures of MDI and polyphenylenepolymethylene polyisocyanates (crude MDI). The polyisocyanates may also be modified, for example by incorporation of isocyanurate groups and in particular by incorporation of urethane groups. The last-mentioned compounds are prepared by reacting polyisocyanates with less than the stoichiometric amount of compounds having at least two active hydrogen atoms and are usually referred to as NCO prepolymers. Their NCO content is in general in the range from 2 to 29% by weight.

In general, polyfunctional alcohols, so-called polyols, or, less preferably, polyfunctional amines, are used as compounds having at least two hydrogen atoms reactive with isocyanate groups.

In a preferred embodiment of the process according to the invention, compact polyurethanes used are those having a hydrophobic treatment. The hydrophobicity can be brought about in particular by addition of hydroxyl-functional components customary in fat chemistry to at least one of the starting components of the polyurethane system, preferably to the polyol component.

A number of hydroxyl-functional components which are customary in fat chemistry and may be used are known. Examples are castor oil, oils modified with hydroxyl groups, such as grape-seed oil, black cumin oil, pumpkin seed oil, borage seed oil, soybean oil, wheat germ oil, rapeseed oil, sunflower oil, peanut oil, apricot kernel oil, pistachio kernel oil, almond oil, olive oil, macadamia nut oil, avocado oil, sea buckthorne oil, sesame oil, hazelnut oil, evening primrose oil, wild rose oil, hemp oil, thistle oil, walnut oil, fatty esters modified with hydroxyl groups and based on myristoleic acid, palmitoleic acid, oleic acid, vaccenic acid, petroselenic acid, gadoleic acid, erucic acid, nervonic acid, linoleic acid, linolenic acid, stearidonic acid, arachidonic acid, timnodonic acid, clupanodonic acid or cervonic acid. Castor oil and the reaction products thereof with alkylene oxides or ketone-formaldehyde resins are preferably used here. The last-mentioned compounds are sold, for example, by Bayer AG under the name Desmophen® 1150.

A further preferably used group of polyols customary in fat chemistry can be obtained by ring opening of epoxidized fatty esters with simultaneous reaction with alcohols and, if appropriate, subsequent further transesterification reactions. The incorporation of hydroxyl groups into oils and fats is effected in the main by epoxidation of the olefinic double bond present in these products, followed by reaction of the epoxide groups formed with a monohydric or polyhydric alcohol. As a result, the epoxide ring becomes the hydroxyl group or, in the case of polyfunctional alcohols, a structure having a larger number of OH groups. Since oils and fats are generally glyceryl esters, parallel transesterification reactions also take place during the abovementioned reactions. The compounds thus obtained preferably have a molecular weight in the range from 500 to 1500 g/mol. Such products are available, for example, from Henkel.

In a particularly preferred embodiment of the process according to the invention, the compact polyurethane used is one which can be prepared by reacting polyisocyanates with compounds having at least two hydrogen atoms reactive with isocyanate groups, wherein the compounds having at least two reactive hydrogen atoms comprise at least one polyol customary in fat chemistry and at least one aromatic hydrocarbon resin modified with phenol, in particular an indene-coumarone resin. These polyurethanes and their components have such a high hydrophobicity that they can in principle even cure under water.

Preferably phenol-modified indene-coumarone resins, particularly preferably industrial mixtures of aromatic hydrocarbon resins, in particular those which comprise compounds of the general formula (I)

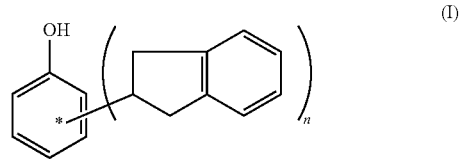

where n is from 2 to 28, as a substantial constituent are used as aromatic hydrocarbon resins modified with phenol and having a terminal phenol group. Such products are commercially available and are available, for example, from Rütgers VFT AG under the trade name NOVARES®.

The aromatic hydrocarbon resins modified with phenol, in particular the phenol-modified indene-coumarone resins, generally have an OH content of from 0.5 to 5.0% by weight.

The polyol customary in fat chemistry and the aromatic hydrocarbon resin modified with phenol, in particular the indene-coumarone resin, are preferably used in a weight ratio of from 100:1 to 100:50.

Together with said compounds, further compounds having at least two active hydrogen atoms may be used. Owing to their high stability to hydrolysis, polyether alcohols are preferred. These are prepared by conventional and known processes, generally by an addition reaction of alkylene oxides with H-functional initiators. The concomitantly used polyether alcohols preferably have a functionality of at least 3 and a hydroxyl number of at least 400 mg KOH/g, preferably at least 600 mg KOH/g, in particular in the range from 400 to 1000 mg KOH/g. They are prepared in a conventional manner by reacting at least trifunctional initiators with alkylene oxides. Initiators which may be used are preferably alcohols having at least three hydroxyl groups in the molecule, for example glycerol, trimethylolpropane, pentaerythritol, sorbitol or sucrose. A preferably used alkylene oxide is propylene oxide.

Conventional constituents, for example, catalysts and conventional assistants and additives, can be added to the reaction mixture. In particular, drying agents, for example zeolites, should be added to the reaction mixture in order to avoid the accumulation of water in the components and hence foaming of the polyurethane. These substances are preferably added to the compounds having at least two hydrogen atoms reactive with isocyanate groups. This mixture is frequently referred to in industry as polyol component. For improving the long-term stability of the composites, it is furthermore advantageous to add agents to prevent attack by microorganisms. Moreover, it is advantageous to add UV stabilizers in order to avoid embrittlement of the moldings.

The polyurethanes used can in principle be prepared without the presence of catalysts. For improving the curing, catalysts may concomitantly be used. The catalysts chosen should preferably be those which result in as long a reaction time as possible. It is thereby possible for the reaction mixture to remain liquid for a long time. It is possible in principle, as described, also to work entirely without a catalyst.

The combination of the polyisocyanates with the compounds having at least two hydrogen atoms reactive with isocyanate groups should be effected in a ratio such that a stoichiometric excess of isocyanate groups, preferably of at least 5%, in particular in the range from 5 to 60%, is present.

The preferably used hydrophobic polyurethanes are distinguished by particularly good processability. Thus, these polyurethanes have particularly good adhesion, in particular to moist substrates, such as wet rock, in particular crushed granite. The polyurethanes cure in virtually compact form in spite of the presence of water. The compact polyurethanes used exhibit completely compact curing even in the case of thin layers.

The preferably used polyurethanes are preferably therefore outstandingly suitable for stabilizing bank slopes, in particular dams and levees. The bond between rock and polyurethane is very strong. Furthermore, particularly with the use of very hydrophobic polyurethanes, there is virtually no hydrolytic degradation of the polyurethanes and hence very long stability of the bank slopes stabilized by the method according to the invention.

For carrying out the process according to the invention, the polyisocyanates are preferably mixed with the compounds having at least two active hydrogen atoms, and this mixture is mixed with the stones. In principle, it would also be possible to add both starting components of the polyurethane separately to the stones and to mix them together with these. In this case, however, nonuniform mixing and hence inadequate mechanical properties of the polyurethane may occur.

The mixing of the starting components of the polyurethane can be effected in a known manner. In the simplest case the components can be introduced in the desired ratio into a vessel, for example a bucket, mixed by simple stirring and then mixed with the stones in the mixing unit. It is also possible to mix the starting components of the polyurethane in a mixing element conventional in polyurethane chemistry, for example a mixing head, to bring this mixture into contact with the stones.

The invention is to be explained in more detail with reference to the following examples.

EXAMPLE 1

(Production of a Crushed rock/Polyurethane Composite by Mechanical Mixing)

About 1200 kg or about 0.5 m$^3$ of crushed rock having an average rock size of about 2 to 10 cm were introduced into a mixing unit (type "Fliegel Duplex Mischschaufel", consisting of a large mixing drum with mixing arms present therein). 18 kg of a separately prepared liquid polyurethane reaction mixture were added to the content of the mixing drum, this reaction mixture having been prepared from 12 kg of a polyol mixture referred to as the polyol component and 6 kg of a polyisocyanate referred to as the isocyanate component. The mixture of crushed rock and liquid polyurethane reaction mixture was thoroughly mixed in the mixing drum for about 2 to 3 min so that the total surface of the crushed rock was wetted with the polyurethane reaction mixture.

The mixing drum was placed with the content so that the content could be directly spread over the bank region to be stabilized. This mixture of crushed rock and polyurethane reaction mixture present on the surface thereof could be distributed with rakes so that, after curing, a uniform solid but water-permeable composite about 30 cm thick formed. The composite withstood the loads caused by the water waves and thus consolidated the bank region.

The invention claimed is:

1. A process for producing a composite comprising a plastic and loose stones, the process comprising:
   mixing loose stones with liquid starting components of the plastic in a mixer to produce a mixture;
   discharging the mixture from the mixer; and
   curing the plastic formed in the mixture to produce a water-permeable composite comprising the plastic and the loose stones, the water-permeable composite being produced such that gaps are formed between the loose stones connected to one another substantially at contact surfaces,
   wherein the loose stones have a size of from 1 to 50 cm, and the plastic is a hydrophobic polyurethane.

2. The process according to claim 1, which is carried out batchwise.

3. The process according to claim 1, which is carried out continuously.

4. The process according to claim 1, wherein the discharging comprises applying the mixture to a surface to be secured or to be stabilized.

5. The process according to claim 1, wherein the discharging comprises introducing the mixture into a mold.

6. The process according to claim 1, further comprising applying sand to a surface of the plastic.

7. The process according to claim 6, wherein the sand has a particle size of 0.06 to 2.0 mm.

8. The process according to claim 1, wherein the plastic is at least one selected from the group consisting of a polyurethane, an epoxy resin, an unsaturated polyester resin, an acrylate, and a methacrylate.

9. The process according to claim 1, wherein the polyol is selected from the group consisting of castor oil, grape-seed oil, black cumin oil, pumpkin seed oil, borage seed oil, soybean oil, wheat germ oil, rapeseed oil, sunflower oil, peanut oil, apricot kernel oil, pistachio kernel oil, almond oil, olive oil, macadamia nut oil, avocado oil, sea buckthorne oil, sesame oil, hazelnut oil, evening primrose oil, wild rose oil, hemp oil, thistle oil, walnut oil, fatty esters modified with hydroxyl groups and based on myristoleic acid, palmitoleic acid, vaccenic acid, petroselenic acid, gadoleic acid, erucic acid, nervonic acid, linoleic acid, linolenic acid, stearidonic acid, arachidonic acid, timnodonic acid, clupanodonic acid or cervonic acid, and polyols which are obtained by ring opening of epoxidized fatty esters with simultaneous reaction with alcohols.

10. The process according to claim 1, wherein the hydrophobic polyurethane is a compact polyurethane.

11. The process according to claim 10, wherein the compact polyurethane is prepared by reacting a polyisocyanate with at least one compound having at least two hydrogen atoms reactive with isocyanate groups, and the at least one compound having at least two reactive hydrogen atoms comprises at least one polyol.

12. The process according to claim 11, wherein the at least one compound comprises at least one polyol and at least one aromatic hydrocarbon resin modified with phenol.

13. The process according to claim 11, wherein the at least one compound comprises at least one aromatic hydrocarbon resin modified with phenol.

14. The process according to claim 13, wherein the aromatic hydrocarbon resin modified with phenol is a phenol-modified indene-coumarone resin.

15. The process according to claim 13, wherein the aromatic hydrocarbon resin modified with phenol has an OH content of from 0.5 to 5.0% by weight.

16. A method for stabilizing and securing a surface which is present at least partly in moving water, comprising:
    mixing loose stones with liquid starting components of a plastic in a mixer to produce a mixture;
    discharging the mixture from the mixer onto the surface to be stabilized and secured; and
    curing the plastic formed in the mixture to stabilize and secure the surface with a water-permeable composite comprising the plastic and the loose stones, the water-permeable composite having gaps formed between the loose stones connected to one another substantially at contact surfaces,
    wherein the loose stones have a size of from 1 to 50 cm, and the plastic is a hydrophobic polyurethane.

17. The method according to claim 16, wherein the stabilizing and securing surface is one of a bank, a hillside, a slope, a supporting element, and a construction element.

18. A method for stabilizing and securing a surface which is present at least partly in moving water, comprising:
    mixing loose stones with liquid starting components of a plastic in a mixer to produce a mixture;
    discharging the mixture from the mixer into a mold;
    curing the plastic formed in the mixture to produce a water-permeable molding comprising the plastic and the loose stones, the water-permeable molding being produced such that gaps are formed between the loose stones connected to one another substantially at contact surfaces; and
    applying the water-permeable molding to the surface,
    wherein the loose stones have a size of from 1 to 50 cm, and the plastic is a hydrophobic polyurethane.

19. The method according to claim 18, wherein the stabilizing and securing surface is one of a bank, a hillside, a slope, a supporting element, and a construction element.

20. The method according to claim 18, further comprising applying sand to a surface of the water-permeable molding, wherein the sand is applied in an amount of from 2 to 4 kg/m² of the water-permeable molding.

* * * * *